(12) United States Patent
Lengning et al.

(10) Patent No.: US 7,317,386 B2
(45) Date of Patent: Jan. 8, 2008

(54) METHOD AND APPARATUS FOR THE OUTPUT OF MUSIC INFORMATION TO AN OPERATOR

(75) Inventors: Marc Lengning, Munich (DE);
Bernhard Schambeck, Wörthsee (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/697,147

(22) Filed: Apr. 5, 2007

(65) Prior Publication Data

US 2007/0182532 A1 Aug. 9, 2007

Related U.S. Application Data

(63) Continuation-in-part of application No. 11/076,255, filed on Mar. 10, 2005, and a continuation-in-part of application No. 11/076,303, filed on Mar. 10, 2005, and a continuation-in-part of application No. 11/076,227, filed on Mar. 10, 2005.

(60) Provisional application No. 60/551,800, filed on Mar. 11, 2004, provisional application No. 60/551,799, filed on Mar. 11, 2004, provisional application No. 60/551,795, filed on Mar. 11, 2004.

(51) Int. Cl.
*B60Q 1/00* (2006.01)
(52) U.S. Cl. ............. 340/439; 340/575; 340/576; 702/182; 702/183; 702/188
(58) Field of Classification Search ............. 340/439, 340/575, 576; 702/182, 183, 188
See application file for complete search history.

(56) References Cited

U.S. PATENT DOCUMENTS

| | | | |
|---|---|---|---|
| 5,150,609 A * | 9/1992 | Ebner et al. | 73/117.3 |
| 5,465,079 A * | 11/1995 | Bouchard et al. | 340/576 |
| 2005/0143884 A1* | 6/2005 | Bihler et al. | 701/36 |

* cited by examiner

Primary Examiner—Tai Nguyen
(74) Attorney, Agent, or Firm—Crowell & Moring LLP (57) ABSTRACT

Music information is output to an operator, such as a vehicle operator, through the use of a portable electronic device. The operator's behavior may be determined on the basis of data received from one or more systems of a moving object which is being controlled or otherwise operated by the operator. One or more individual pieces (or playlists) of music may be respectively stored as music information, for example, corresponding to different detected behaviors or moods of the operator and/or the operation conditions.

20 Claims, 4 Drawing Sheets

METHOD AND APPARATUS FOR THE OUTPUT OF MUSIC INFORMATION TO AN OPERATOR

CROSS REFERENCE

The present application is continuation-in-part of U.S. patent application Ser. No. 11/076,255 filed on Mar. 10, 2005, which claims the benefit of priority under 35 U.S.C. § 119 to U.S. Provisional Patent Application No. 60/551,795, filed Mar. 11, 2004. The present application is also a continuation-in-part of U.S. patent application Ser. No. 11/076,303 filed on Mar. 10, 2005, which claims the benefit of priority under 35 U.S.C. § 119 to U.S. Provisional Patent Application No. 60/551,800, filed Mar. 11, 2004. The present application is further a continuation-in-part of U.S. patent application Ser. No. 11/076,227 filed on Mar. 10, 2005, which claims the benefit of priority under 35 U.S.C. § 119 to U.S. Provisional Patent Application No. 60/551,799, filed Mar. 11, 2004.

BACKGROUND

Sound has always been an important part of the driving experience. In the context of pieces of music, automobile operators regularly rely on their music collections as a motivational tool during the drive to work, for example, to relax in busy traffic conditions, or to just escape from the world around them. In addition, audible alerts, instructions and various sound effects have been incorporated into vehicle systems to provide operators with a host of different types of information.

More recently, however, portable music players have extended the ability to enjoy one's music collection to situations outside the automobile. For example, such portable music players enable motorcyclists, boaters and even bicyclists to enjoy the same musical benefits that automobile drivers have been enjoying for many years. By the same token, joggers and like now never have to be apart from their music, and hence the ability to musically enhance their overall experience.

However, currently an individual desiring to match music, or other mood-altering sounds, to their particular circumstances is relegated to having to manually select a song or playlist. This can be an inconvenient process, for example, particularly where the operator is engaging in an otherwise demanding activity (e.g., jogging, cycling, driving a motorcycle, etc.). As such, there is a need in the art for a method and apparatus for outputting music information to an operator based, at least in part, on operator behavior.

SUMMARY OF THE INVENTION

Disclosed and claimed herein is a method and apparatus for the output of music information to an operator of a moving object. In one embodiment, a portable electronic device usable by an operator of a moving object includes an input/output interface configured to connect the portable electronic device to an information system of the moving object, a memory containing processor-executable instructions, and a processor electrically coupled to the memory. In one embodiment, the processor is configured to execute the processor-executable instructions to store music information corresponding to a plurality of different operator behaviors and/or operator conditions, receive data from an information system of the moving object, determine operator behavior information based on said data, and output a selected piece of the music information corresponding to the determined operator behavior information.

Other objects, advantages and novel features of the present invention will become apparent from the following detailed description of the invention when considered in conjunction with the accompanying drawings.

DETAILED DESCRIPTION OF THE DRAWINGS

Overview

One aspect of the invention relates to a process for the output of behavior-specific music information to an operator, such as a vehicle operator, through the use of a portable electronic device, such as a cellular telephone, smartphone, personal digital assistant (PDA), portable MP3 player, portable gaming console, handheld computer, etc. In certain embodiments, the operator's behavior is determined on the basis of data received from one or more systems of a moving object which is under the control of or otherwise operated by the operator.

Music information may be any form of mood-altering sounds, such as pieces of music, sound effects or pleasing natural voices. In the context of a vehicle, for example, a process is disclosed for the output of music information using an electronic device in a vehicle, in which the driver's behavior is determined on the basis of data of one or more driving systems and/or one or more comfort systems of the vehicle. While in one embodiment this process may be performed by the aforementioned portable electronic device, in another embodiment it may be performed by the vehicle's onboard computer system, or a combination thereof.

One or more individual pieces of music may be respectively stored as music information, for example, corresponding to different detected behaviors or moods of the driver and/or the attendant traffic situation. Such music pieces may be stored on the portable electronic device, and/or by the vehicle's onboard system.

Still with reference to a vehicle application, data relevant to the driving condition and/or driver's behavior may be analyzed, and the selection of pieces of music controlled as a function of this data. In certain embodiments, the pieces of music may be correspondingly taken from a table (or database) in which one or more pieces of music may be associated with particular categories of driving behavior. For this purpose, a piece of music may be played as a function of the driver's driving behavior and/or driving situation, where the musical characteristics of the selected piece of music tend to increase the driver's awareness or state and, thus increase driving safety.

By way of a non-limiting example, assuming a subject driver is driving in good weather in a recognizably relaxed state along a moderately curved country road at an appropriate and constant speed. The state of the driver is indicated, for example, on the basis of the amplitudes, the speed and the changes of speed of his steering movements. In one embodiment, this may be interpreted as a relaxed state of driving, and a "vibrant" piece of music may be selected at an easily audible volume.

Suppose now that a different situation exists. In this case, the subject driver moves recognizably hectically in dense traffic, which threatens to result in a traffic jam. In contrast to the above-considered case, his steering movements are significantly unsteady and the vehicle speed is subject to significant and immediate changes. In one embodiment, this may be interpreted as an agitated state of driving, and a "calm" piece of music may be played at a lower soothing volume, for example.

In both of the above cases, the music information has the purpose of improving the driver's mood or state and, thus, contributing to increase traffic safety. This is based on the thought that drivers who are relaxed and who are concentrating are clearly involved in fewer accidents.

When there is a clear change in the traffic situation, it may be advantageous to interrupt the piece of music currently being played and to immediately change over to another piece of music which corresponds to, or "fits," the current traffic situation. This case occurs, for example, when the driver turns from a relatively unpopulated side street into a main street with dense traffic. In certain embodiments, the music information may assist the driver in countering or otherwise optimizing his mood or state during his driving activity.

Unlike other driving assistance systems, the music information is a form of passive assistance in that it does not expect nor illicit a direct response from the driver. In this fashion, it can be used conjunctively with and without interference of traditional instruction-based systems (e.g., navigation systems).

The aforementioned aspects of the invention may be equally applicable to other contexts in which an operator's behavior may be measured and used to select and playback a behavior-specific piece (or playlist) of music. For example, motorcyclists, bicyclists or any other operator of a moving object may be similarly benefited from the principles of the invention.

Another aspect of the invention is to enable a user of a portable electronic device to customize vehicle outputs, of whichever vehicle the user happens to be in, based on a set of user preferences which are stored in (or accessible by) a portable electronic device. In one embodiment, the portable electronic device may be configured to interface with the vehicle's onboard computer in order to modify the default vehicle outputs in accordance with the user preference data. Such vehicle outputs may include but not be limited to sounds, lights and/or displays associated with any of the various vehicle driving systems and/or comfort systems. Such vehicle outputs may include music information in the form of sound effects, natural voices, instructions or the like.

In certain embodiments, such vehicle outputs may include the simultaneous output of different forms of sound, including but not limited to the simultaneous output of pieces of music, audible alerts and/or one or more sounds effects. In the case of simultaneous audible vehicle outputs, volumes of some or all of such simultaneous outputs may be automatically adjusted so that the operator can hear higher priority vehicle outputs.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive. Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that may be performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable medium, which may include any medium that can store or transfer information. Examples of the processor readable mediums include an electronic circuit, a semiconductor memory device, a read-only memory (ROM), a flash memory or other non-volatile memory, a floppy diskette, a CD-ROM, an optical disk, a hard disk, a fiber optic medium, a radio frequency (RF) link, etc.

EXEMPLARY EMBODIMENTS

Figure 1:
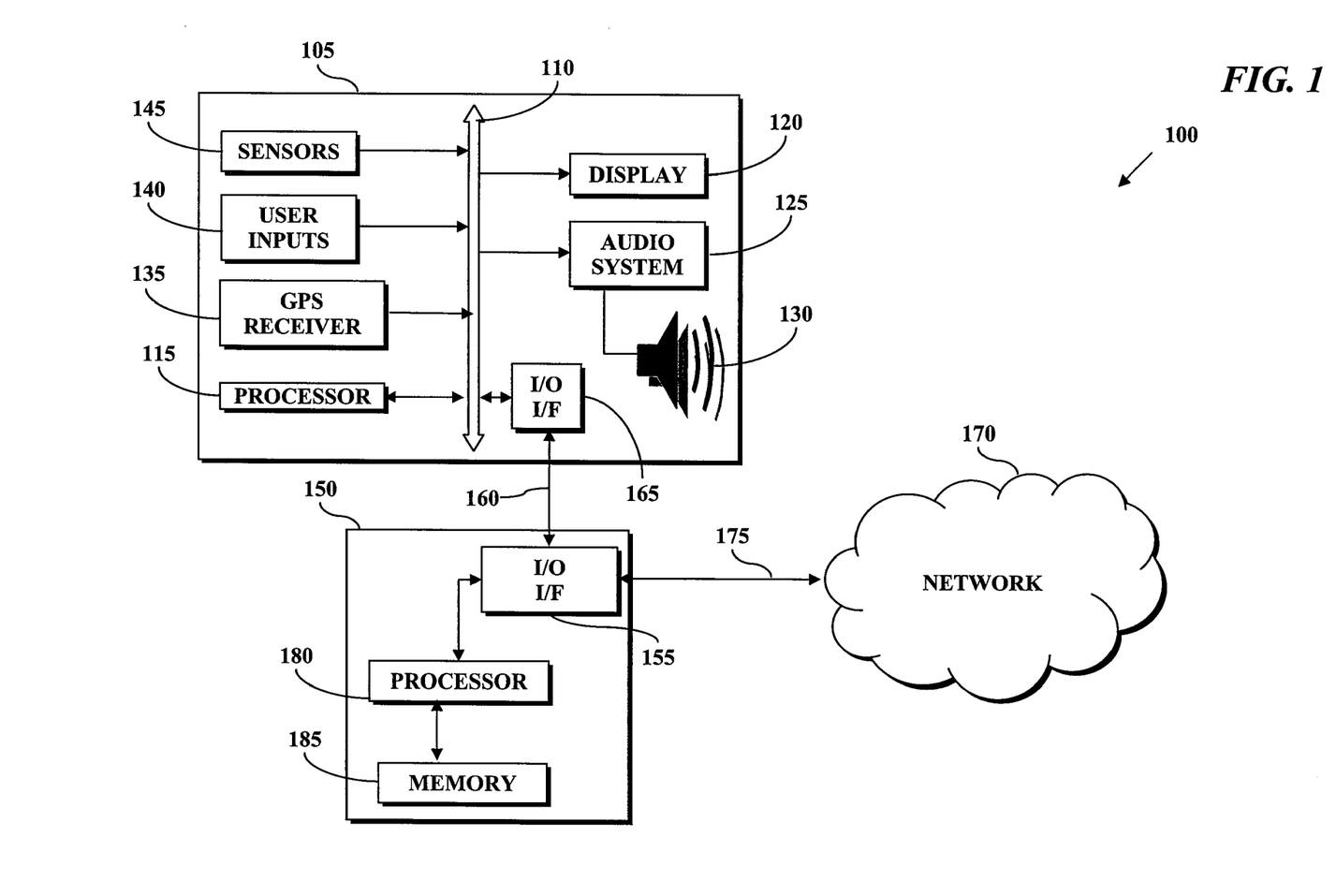
FIG. 1 is a schematic block diagram of a system for the output of music information in a vehicle in accordance with one embodiment.

Referring now to the figures, FIG. 1 depicts a system 100 for the technical implementation of one embodiment of the invention. While system 100 is described with reference to a vehicle system, it should equally be appreciated that the principles therein may be applicable to any other information system of a moving object which is controlled or otherwise operated by a human operator.

System 100 includes a vehicle information system 105 in which numerous subsystems are electrically connected by bus 110. It should be appreciated that while several components to vehicle information system 105 are depicted in FIG. 1, there may similarly be many more components, as is known in the automotive industry.

In FIG. 1, vehicle information system 105 includes processor 115 configured to control display 120, such as a liquid crystal display or the like, and an audio system 125 coupled to a speaker system 130. The vehicle information system 105 may further include a GPS receiver 135 and a plurality of user inputs 140. While there are numerous possible user inputs for the vehicle information system 105, some exemplary inputs may relate to the operation of the radio (e.g., audio system 125), integrated compact disc player, windshield wipers, headlamps, navigation system (e.g., GPS receiver 135), cruise control (speed control), gear stick, steering wheel, vehicle theft deterrence system, power window, seat adjustment, air conditioning system, antenna position (for telescoping antenna), integrated cellular phone, central locking system, cigarette lighter, window defrosting, electric convertible top, fuel filler door, sunroof, hazard warning flashers, heated seats, hood release, horn, instrument panel, parking brake, power seat adjustment, reading lamps, rear window defroster and washer, rearview mirror adjuster, tripometer, turn signals, etc.

Similarly, vehicle information system 105 includes a plurality of vehicle sensors 145 electrically connected to the processor 115 via bus 110. Some exemplary vehicle sensors 145 may include sensors relate to detecting an open car door, open trunk, open hood, sunroof position, windshield wiper status, windshield washer fluid status, tow hitch usage, daytime running lamp status, foglamp and headlamp status and/or malfunction, distance sensor, parking sensor, status of air filter or fuel filter, engine management system, engine control unit, fuel pump status, fuel tank status, emissions control devices, oxygen sensor, battery status, spark plug status, GPS, head-up display (HUD) status, mileage and speed related sensors for outputting to a vehicle odometer, speedometer, tachometer and trip computer, hand brake position, steering-related sensors, vehicle theft deterrence system status, airbag status, automatic seatbelt status, child safety lock status, air conditioning setting, car audio setting, car phone status, power window usage, braking system status, engine coolant status, engine oil status, washer fluid level, mirror positions, seat positions, tire air pressure, antenna position (for telescoping antenna), antifreeze status, brake pad status, catalytic converter status, central locking system setting, drive belt status, dynamic stability control system, convertible top status operation, fuel filler door status, fuel tank status, status of fuses, heated seat setting, parking brake status, traction control system, tire tread depth, turn signals, etc.

More advanced vehicle sensors 145 may relate to detecting the head position and/or retinal position of the vehicle operators so as to deduce which direction the operator may be looking at. This information may be useful in determination whether the driver is aware of a potentially hazardous situation or not. Vehicle sensors 145 may further include external sensors directed to detecting outside conditions. Such external sensors may be used in an advanced driver assistance system which includes capabilities for night visions detection, traffic sign detection and/or adaptive cruise control.

Continuing to refer to FIG. 1, system 100 further includes a portable electronic device 150, which includes an I/O interface 155 configured to establish a communication link 160 with an I/O interface 165 of the vehicle information system 105. While in on one embodiment, the I/O interface 165 of the vehicle information system 105 may correspond to an onboard diagnostics connector, it should equally be appreciated that numerous other means of communicating with the vehicle information system 105 are possible, including any wired or wireless communication link. Thus, it should be appreciated that communication link 160 may correspond to a wired connection, such as universal serial bus (USB), Ethernet, IEEE 1394 high speed serial bus, or any other wired data connection. Similarly, communication link 160 may correspond to a wireless connection, such as a cellular-based connection link (e.g., Global System for Mobile (GSM) communications, General Packet Radio Service (GPRS), Code Division Multiple Access (CDMA) or Wideband CDMA (WCDMA)), as well medium- and near-field radio frequency links such as 802.11 Wi-Fi or Bluetooth™.

It should further be appreciated that the GPS receiver 135 may be integrated with the portable electronic device 150, such that navigation functions may be provided by the portable electronic device 150. In addition, portable electronic device 150 may be optionally configured to connect to a remote network 170 (e.g., the Internet) via optional wireless communication link 175. As shown, portable electronic device 150 includes a processor 180 and a memory 185, both of which are described in more detail below with reference to FIG. 2. In certain embodiments, processor 180 may be configured to execute computer-executable instructions stored in memory 185 to analyze the respective driving situation and the operator's behavior by means of behavior information received from the vehicle sensors 145 and/or processor 115 via communication link 160. In certain embodiments, memory 185 may include a database of music in which categories, playlists or individual pieces of music have been assigned to various specific driving situations/behaviors. To that end, and as will be described in more detail below, the behavior information received via communication link 160 may be used by the portable electronic device (or an application executing thereon) to select from among the individual music categories/playlists. In one embodiment, if the driving situation/behavior is maintained, the selected piece (or playlist) of music may possibly be repeated several times. If, however, the driving situation changes, the processor 180 may correspondingly automatically select a different piece (or playlist) of music for the now-current operator behavior.

It should of course be appreciated that the actual music data may be stored in memory 185 of the portable electronic device 150, or by the vehicle information system 105. In the case where the music is stored by the portable electronic device 150, the communication link 160 may also be used to stream or otherwise transmit the music data to the vehicle information system 105 for decoding and playing by the audio system 125. If, on the other hand, the music data is stored by the vehicle information system 105, then the portable electronic device 150 may instead transmit an instruction to the vehicle information system 105 (e.g., to processor 115) indicating which piece (or playlist) of music should be played for the given operator behavior. Thus, it should be appreciated that the term "music information" may refer to the actual music data or to one or more instructions corresponding to location information or other identifier of externally-stored music data.

Portable electronic device 150 may further store operator preference data for customizing the various vehicle outputs. Such operator preference data may be communicated to the vehicle system processor 115 via communication link 160, and used thereby to customize the various visual and audible sensor information provided by the vehicle sensors 145. For example, operator preference data may be used to customize the sound effects associated with things like operating windows, seat adjustments, operating the air conditioning system, opening a sunroof, opening/closing doors. Such sound effects may further relate to driving dynamics, such as steering, accelerating and braking.

Another aspect of the invention relates to the outputting of natural voices to provide instructions or information to a vehicle operator, which may or may not be based on the aforementioned user preference data. For example, one or more of vehicle sensors 145 may be usable to detect vehicle dynamics. Based on such detected vehicle dynamics, the operator may be informed as to the state of the vehicle in a pleasing or entertaining way. By way of non-limiting examples, such information may include an acceleration time report, a braking time report, a top speed/rpm announcement and/or a power reserve announcement (e.g., "You're at 80% of max torque"). Such natural voices may be further directed to providing the operator with warning-based information, such as seat belt states, parking brake, low fuel (with optional location-based information for a gas station), oil and water status. Other warning information may relate to warnings based on inferred information of the driver's behavior or upcoming operation conditions (e.g., driving for extended periods of time ("Take a Break), or an icy road warning.

In other embodiments, the natural voices may further relate to instructions or information for improving safety or for general operator assistance. By way of example, a parking assistant, based on data received from the vehicle sensors 145, may provide natural voice feedback instructing (e.g., "Two feet left, go further"). Similarly, vehicle sensors 145 may detect that the operator has departed from the vehicle's intended lane, and a natural voice warning (e.g., "Over the line!") may be used to alert the driver to this fact. Other applications may include, assistance with lane changing, cruise control (e.g., "take over please"), night vision (e.g., "There is something on your right hand side!) and/or a fuel economy assistant. Such natural voices may further be usable in the context of advanced driver assistance system, such as night vision detection, traffic sign detection and/or adaptive cruise control systems.

It should further be appreciated that the natural voice information may include such information as driving statistics, travel range, time to destination and so on. In certain embodiments, the natural voice information may be customizable based on the aforementioned user preference data, and/or may be a form of a mood-altering sound, such as a pleasing welcome note ("Good to see you", "Let's go for a ride," "Happy Birthday," Have a good weekend," etc.)

It should be appreciated that such natural voice information may comprise a mood-altering sound, such sound effects or natural voices, which are context-sensitive. By way of example, a friendly voice may be used to provide useful information, while a more stern voice may be used to provide safety-related instructions.

Figure 2:
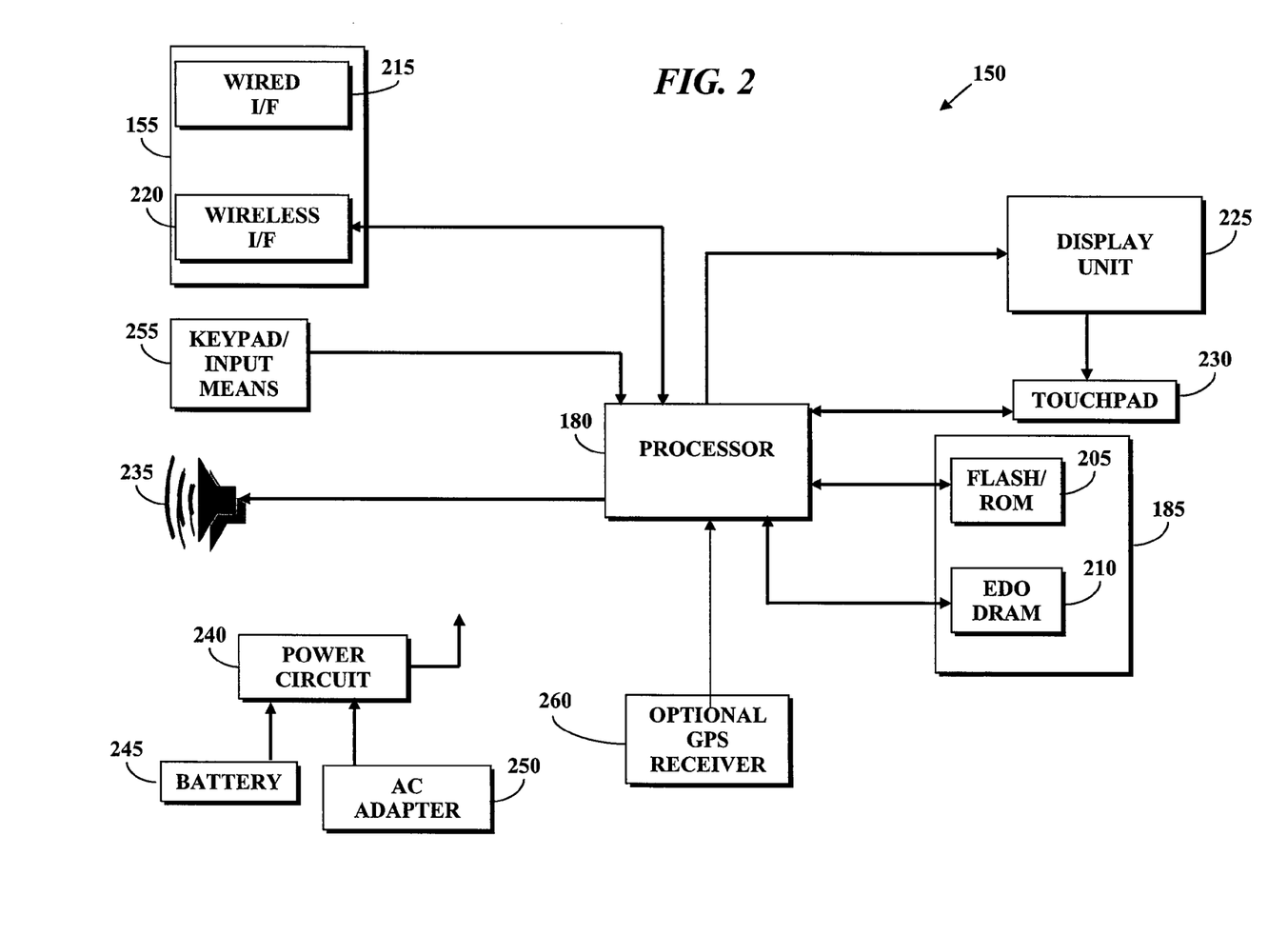
FIG. 2 is a schematic block diagram of a portable electronic device for the output of music information to an operator in accordance with another embodiment of the invention.

With reference now to FIG. 2, depicted is a more detailed block diagram of the portable electronic device 150 of FIG. 1. As previously mentioned, portable electronic device 150 may be embodied as a cellular telephone, smartphone, PDA, portable MP3 player, portable gaming console, handheld computer, or the like. As shown in FIG. 2, portable electronic device 150 includes the processor 180, which may be a general processor, a digital signal processor, an application specific integrated circuit, digital logic device, an analog processor or other now known processing circuit. In addition, memory 185 is depicted as including a flash ROM (Read Only Memory) 205 and an EDO DRAM (Extended Data Out Dynamic Random Access Memory) 210, although it should equally be appreciated that any other form of volatile and/or non-volatile memory usable in consumer electronics may comprise the memory 185. In certain embodiment, the flash ROM 205 may store a processor-executable programs, such as an operating system or any number of application programs. Similarly, the EDO DRAM 210 may store computer code that has been loaded from ROM 205 and being executed by the processor 150.

The I/O interface 155 may be comprised of both a wired interface 215 and a wireless interface 220. As discussed above, the I/O interface 155 may be configured to establish a wired and/or wireless communication link (e.g., communication link 160 of FIG. 1) with an electronic information system, such as vehicle information system 105, but in other embodiments any electronic information system capable of measuring an operator's behavior while controlling or otherwise operating a moving object (e.g., motorcycle, bicycle, etc.)

Additionally, I/O interface 155 may be configured to transfer data to/from an external storage device (e.g., USB flash drive), and/or an external network (e.g., network 170). The flash ROM 205, the EDO DRAM 210 and the I/O interface 155 may all be connected to the processor 180 via an address bus and a data bus (not shown).

Continuing to refer to FIG. 2, portable electronic device 150 is further depicted as including a display unit 225 configured to receive data from the processor 180 and to display images and/or text in accordance with the received data. If a touchpad 230 disposed below the display unit 225 is operated, data may be provided by the display unit 225 corresponding to such operation (for example, data indicating coordinates of a touched point) and supplied as a signal corresponding to the received data to the processor 180 via a serial bus.

Portable electronic device 150 may further include an audio subsystem 235 which is configured to receive voice/sound data supplied by the processor 180, and to generate a voice/sound corresponding to such received data.

A power circuit 240 generates electric power from a battery 245 installed in the portable electronic device 150, or by means of converting the voltage supplied from an alternating current adapter 250, and supplies the electric power to various parts of the portable electronic device 150, such as the processor 180 and the audio subsystem 235.

The portable electronic device 150 is equipped with a keypad/user input means ("user input") 255. While in one embodiment, the user input 255 may include a keypad, it should equally be appreciated that the user input 255 may be comprised of buttons, switches, a jog dial, touchpad 230, a voice recognition subsystem, an externally-connected keyboard, etc.

Finally, portable electronic device 150 may be equipped with optional GPS receiver 260 so as to enable the device 150 to provide GPS functionality. It should be appreciated that mapping data may be stored in memory 185 or downloaded via wireless I/F 220. In this fashion, the portable electronic device 150 may function as a navigation system for the connected information system (e.g., vehicle system 105), or as a standalone navigation system.

In another embodiment, memory 185 may also store operator preference data usable to customize one or more system outputs. In the context of a vehicle information system (e.g., vehicle information system 105), such preference data may correspond to customizing vehicle system outputs, such as the visual and/or audible alerts associated with opened car doors, headlamp status, distance sensors, parking sensors, engine management system information, fuel tank status, battery status, navigation information, mileage and speed information, vehicle theft deterrence system information, seatbelt status, car audio setting, etc. Such operator preference data may be transmitted from the portable electronic device 150 via I/O interface 155.

In another embodiment, memory 185 may store a behavior detection application executable by processor 180. The behavior detection application, in one embodiment, may be usable to select specific pieces (or playlists) of music depending on the operator's behavior and/or operating conditions relative to the controlling of a moving object.

Figure 3:
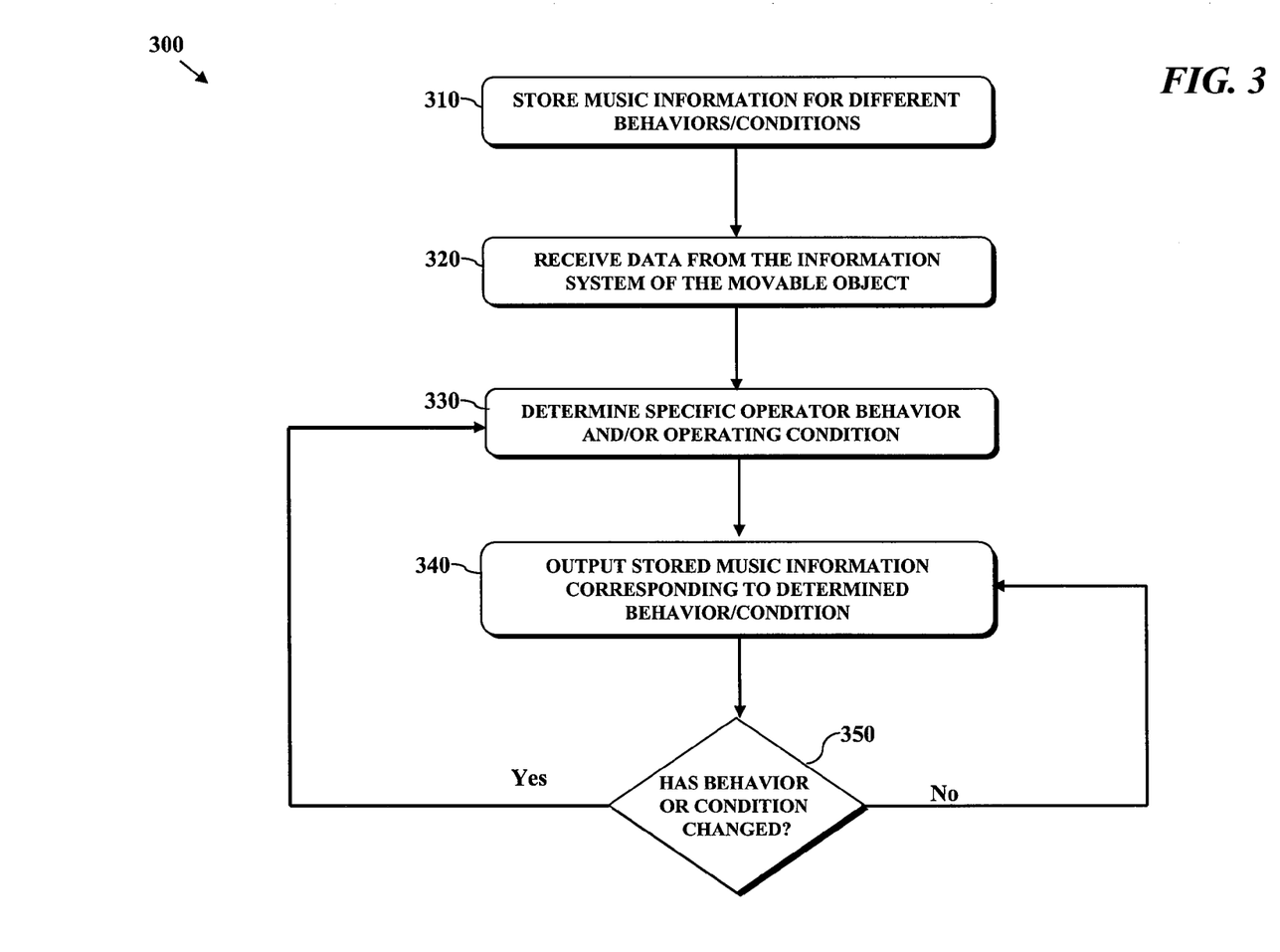
FIG. 3 is a flowchart illustrating an exemplary process for the output of music information to an operator in accordance with one embodiment of the invention.

To that end, FIG. 3 provides an exemplary illustration of a process flow 300 for a behavior detection application in accordance with the principles of the invention. Process 300 begins at block 310 where music information is stored in a manner which associates it with a plurality of different operator behaviors and/or operation conditions. It should be appreciated that the music information may be stored as pieces (or playlists) of music, or alternatively such music information may comprise location information for where the pieces (or playlists) of music are stored (e.g., external storage, network storage, etc.). As previously mentioned, such music information may be any form of other mood-altering sounds, such sound effects or natural voices (e.g., friendly voice for providing useful information, stern voice for safety-related instructions, etc.).

In one embodiment, the music information may be stored in a relational database or lookup table in which the pieces (or playlists) of music are associated with predetermined behavior information. As previously mentioned, such music information may be in the form of other mood-altering sounds, such as sound effects or natural voices.

Process 300 continues to block 320 where data may be received from an information system (e.g., vehicle information system 105) of the moving object. In one embodiment, this data corresponds to sensor data (e.g., from sensors 145), although it may correspond to any other form of data from which operator behavior may be inferred.

Referring now to block 330, a determination of the current operator behavior and/or operating conditions is made. In one embodiment, this behavior information corresponds to information received from a connected information system, which may be comprised of one or more system sensors (e.g., sensors 145). In one embodiment, the information system may provide the behavior information in the form of a plurality of sensor values, from which a particular operator behavior and/or operating condition may be inferred. By way of a non-limiting example in the context of a vehicle operator, it may be inferred from rapid steering changes accompanied by successive braking actions that the operator is agitated. Conversely, a constant speed with little steering movement and no braking may be representative of a relaxed operator state. It should of course be appreciated that there may be a wide range of system variables, and combination thereof, which can be used to infer specific operator behavior, and the invention is not intended to be limited to any particular embodiment thereof. Moreover, the type of moving object be controlled or otherwise operated by the operator may determine the specific system variables that are usable to infer behavior information.

Continuing to refer to FIG. 3, process 300 continues to block 340 where the actual music information corresponding to the determined behavior information (e.g., from block 330) may be output. In on embodiment, the operation of block 340 may involve outputting the actual music data from a memory (e.g., memory 185) of the portable electronic device (e.g., device 150) via a communication link with the information system (e.g., vehicle information system 105). Alternatively, the operation of block 340 may involve outputting an instruction via the communication link instructing the connected information system to play the behavior-specific music information to the operator. Put another way, when the music data is stored by the connected information system, the portable electronic device may instead transmit an instruction to the system indicating which piece (or playlist) of music should be played for the given operator behavior.

Process 300 may then continue to block 350 where a determination is made as to whether the behavior information determined above at block 330 has changed. If no change in operator behavior or operating conditions is detected, process 300 may simply loop back to block 340 where the process continues to output the appropriate music information in accordance with the existing behavior and/or conditions. In this loop, the piece of music may possibly be repeated several times, including possibly with a pause in between each replay. Alternatively, the music information may comprise a playlist including a plurality of pieces of music all corresponding to the same behavior information.

If, on the other hand, there is such a change, process 300 may loop back to block 330 where updated behavior information may be determined and a corresponding change (if any) in the music information subsequently made at block 340. While in one embodiment this may involve a detected change in the operator's behavior as discussed above in detail, in another embodiment it may be surrounding operating conditions that have changed. In the context of a vehicle information system, one example of when the surrounding operating conditions may be changing includes detecting dense traffic condition ahead. For example, the vehicle's navigation system may continually receive traffic information from a live traffic information source and compare the vehicle's location (e.g., using GPS receiver 135) to the indicated location of the received traffic information. While the operator's behavior may not have changed yet, the process 300 may detect an imminent change in the operating conditions, and hence loop back to block 330 to determine the applicable behavior/conditions information that should be used to select updated music information.

Still another example of a changing operator condition which may or may not involve a corresponding change in operator behavior involves detecting changing weather conditions. In one embodiment, such changing whether conditions may be detected based on operator behavior, such as windshield wiper activation, etc. In another embodiment, such changing weather conditions may be detected by an external weather information source which is in communication with the subject system (e.g., accessing an online weather forecast database).

Similar, in the context of vehicle operation, the vehicle's GPS system (e.g., GPS receiver 135) may detect that the vehicle is approaching a known area which has particular qualities. For example, the known area may be known as a particularly scenic area and, in response thereto, a pre-defined playlist of piece of music may be played. In contrast, an area known to be densely populated may be detected ahead and, in response, a correspondingly different type of music may be selected.

With reference back to block 340 of FIG. 3, it should further be appreciated that such music information may comprise other forms of mood-altering sounds than just pieces of music. As previously discussed, music information may include any form of mood-altering sounds, such as pieces of music, sound effects or pleasing natural voices. To that end, block 340 may comprise outputting of natural voices to provide instructions or information to a vehicle operator, based on the vehicle operator behavior or on the operating conditions in general. That is, based on the operator behavior and/or operation conditions determined at block 330, the output of block 340 may comprise sound effects or natural voices which tend to be pleasing or entertaining so as to have a calming or mood-lightening effect. Similarly, such sound effects or natural voices may server to intensify the operator's mood when prompt action is required, such as for safety reasons.

It should further be appreciated that the output of block 340 may comprise the simultaneous output of different forms of sound, including but not limited to the simultaneous output of pieces of music, natural voices, audible alerts and/or sounds effects. In certain embodiments, the volumes of one or more of such simultaneous audible outputs may be automatically adjusted so that the operator can hear higher priority outputs over lower priority outputs. For example, music pieces being played may fade out while a natural voice provides the operator with safety-based information.

Figure 4:
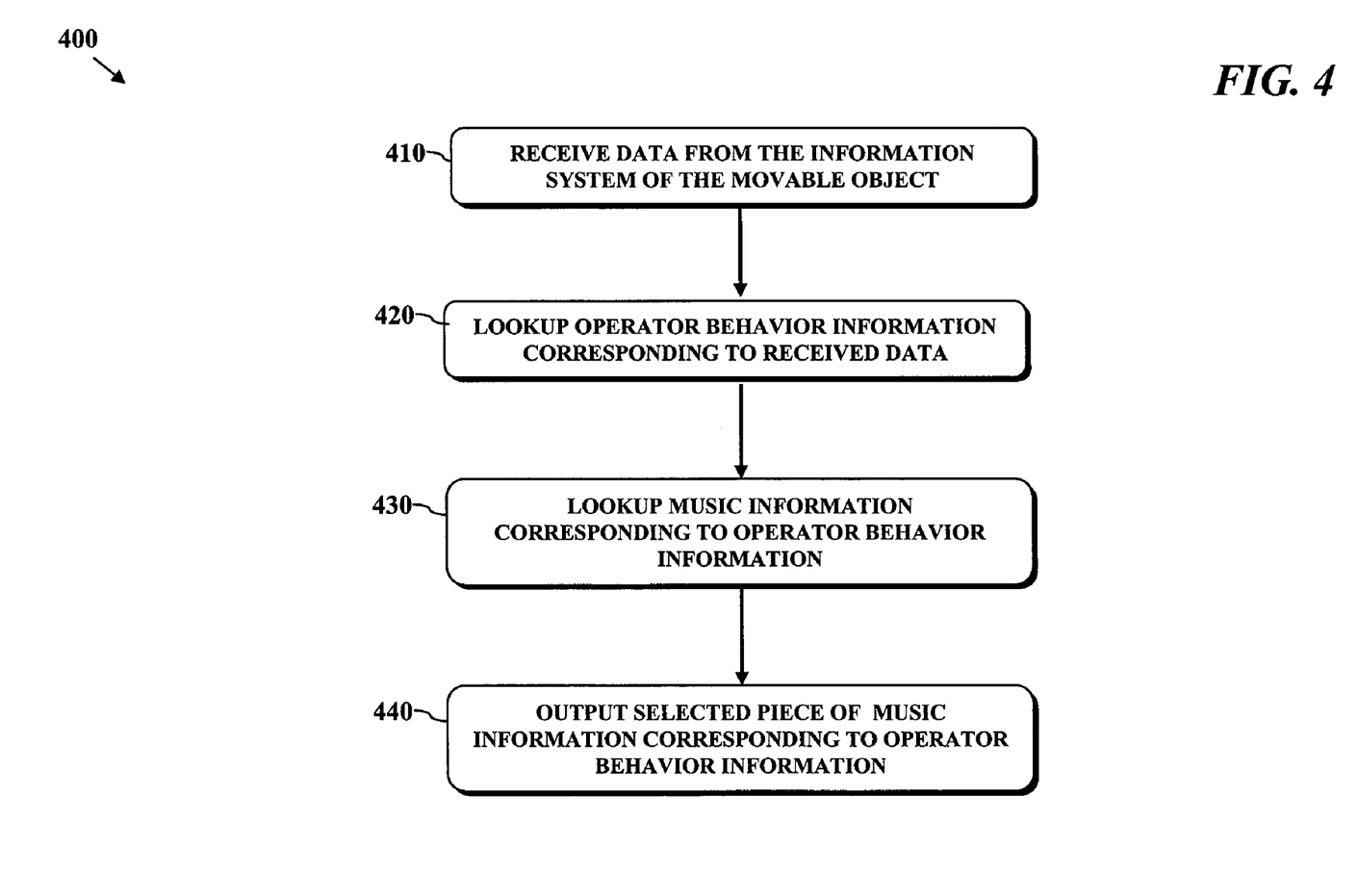
FIG. 4 is a flowchart illustrating an exemplary process for the output of music information to an operator in accordance with another embodiment of the invention.

FIG. 4 provides another embodiment of a process 400 for how to implement one or more aspects of the invention using a portable electronic device in communication with an information system of a moving object. Process 400 begins at block 410 where data may be received from the information system of the moving object with which the portable electronic device is in communication. In one embodiment, this data may correspond to sensor data, such as the raw underlying values detected by the information system (e.g., speed, direction, acceleration, duration of activity, etc.), although the data may be in any other form from which operator behavior may be inferred.

Referring now to block 420, a lookup operation may be performed pursuant to which particular operator behavior information may be determined based on the data received above at block 410. In one embodiment, this behavior information may include a plurality of entries corresponding to behavior categories. A lookup operation using the data may be performed to see which behavior category corresponds to the values in the received data. That is, the received values may be correlated to particular known operator behaviors.

Once the operator behavior has been determined, process 400 may continue to block 430 where a second lookup operation may be performed. In this case, however, it is the previously-determined operator behavior information which is used to conduct the lookup operation. That is, the operator behavior information may be stored as a plurality of tables entries, each of which has associated music information. The lookup operation of block 430 may be performed using the operator behavior information to see which piece (or playlist) of the music information is to be selected.

Finally, process 400 continues to block 440 where the selected piece of music information corresponding to the operator behavior information of block 430 may be output to the operator. As previously described, the operation of block 440 may involve outputting the actual music data from a memory (e.g., memory 185) of the portable electronic device (e.g., device 150) via a communication link with the information system, or may involve outputting an instruction via the communication link instructing the connected information system to play the behavior-specific music information to the operator.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A portable electronic device usable by an operator of a moving object to output behavior-specific music information comprising:
   a input/output interface configured to connect the portable electronic device to an information system of the moving object;
   a memory containing processor-executable instructions; and
   a processor electrically coupled to the memory, the processor configured to execute the processor-executable instructions to:
      store music information corresponding to a plurality of different operator behaviors and/or operator conditions,
      receive data from an information system of the moving object;
      determine operator behavior information based on said data; and
      output a selected piece of said music information corresponding to the determined operator behavior information.

2. The portable electronic device of claim 1, wherein the information system comprises a plurality of sensors configured to detect actuation of one or more operator inputs to the moving object.

3. The portable electronic device of claim 1, wherein the music information is selected from the list consisting of: data corresponding to pieces of music, data corresponding to a playlist of music, and location information.

4. The portable electronic device of claim 1, wherein the processor is configured to further execute the processor-executable instructions to:
   receive updated data from the information system of the moving object;
   determine if there has been a change in the operator behavior information based on said updated data; and
   output a different piece of said music information when said change in operator behavior information has been determined.

5. The portable electronic device of claim 1, wherein the processor is configured to further execute the processor-executable instructions to:
   receive data from an external source corresponding to an upcoming condition affecting the moving object;
   determine operation condition information based on said received data; and
   output the selected piece of said music information corresponding to the determined operation condition information.

6. The portable electronic device of claim 5, wherein the operation condition information corresponds to one of weather information, traffic information and road-type information.

7. The portable electronic device of claim 1, wherein the processor is configured to further execute the processor-executable instructions to transmit operator-specific customizing information to the information system, wherein said customization information is usable to modify default system outputs of the information system.

8. The portable electronic device of claim 1, wherein said data comprises sensor data from the moving object.

9. The portable electronic device of claim 1, wherein said processor is further to perform a first lookup operation using said data to determine the operator behavior information.

10. The portable electronic device of claim 9, wherein said processor is further to perform a second lookup operation using said operator behavior information to identify the selected piece of music information.

11. A method for outputting behavior-specific music information to an operator of a moving object using a portable electronic device that is in communication with an information system of the moving object, the method comprising the acts of:

storing music information corresponding to a plurality of different operator behaviors and/or operator conditions, receiving data from an information system of the moving object;

determining operator behavior information based on said data; and outputting a selected piece of said music information corresponding to the determined operator behavior information.

12. The method of claim 11, wherein the information system comprises a plurality of sensors configured to detect the actuation of one or more operator inputs to the moving object.

13. The method of claim 11, wherein the music information is information selected from the list consisting of: data corresponding to pieces of music, data corresponding to a playlist of music, and location information.

14. The method of claim 11, further comprising the acts of:

receiving updated data from the information system of the moving object;

determining if there has been a change in the operator behavior information based on said updated data; and outputting a different piece of said music information when said change in operator behavior information has been determined.

15. The method of claim 11, further comprising the acts of:

receiving data from an external source corresponding to an upcoming condition affecting the moving object;

determining operation condition information based on said received data; and outputting the selected piece of said music information corresponding to the determined operation condition information.

16. The method of claim 15, wherein the operation condition information corresponds to one of weather information, traffic information and road-type information.

17. The method of claim 11, further comprising the act of transmitting operator-specific customizing information to the information system, wherein said customization information is usable to modify default system outputs of the information system.

18. The method of claim 11, wherein said data comprises sensor data from the moving object.

19. The method of claim 11, further comprising the act of performing a first lookup operation using said data to determine the operator behavior information.

20. The method of claim 19, further comprising the act of performing a second lookup operation using said operator behavior information to identify the selected piece of music information.

* * * * *